US006813620B2

(12) United States Patent
Lin et al.

(10) Patent No.: US 6,813,620 B2
(45) Date of Patent: Nov. 2, 2004

(54) BINARY SEARCH ENGINE AND METHOD

(75) Inventors: Jonathan Lin, Fremont, CA (US);
David Billings, Campbell, CA (US);
Mike Jorda, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 429 days.

(21) Appl. No.: 10/083,591

(22) Filed: Feb. 27, 2002

(65) Prior Publication Data
US 2002/0129189 A1 Sep. 12, 2002

Related U.S. Application Data
(60) Provisional application No. 60/273,517, filed on Mar. 7, 2001.

(51) Int. Cl.[7] .............................................. G06F 17/30
(52) U.S. Cl. ................................ 707/10; 707/3; 707/8; 709/216; 709/217; 711/148
(58) Field of Search ................................ 707/1, 2, 3, 5, 707/10, 100, 104.1; 365/189.01; 711/200, 216, 1, 148; 710/5, 10, 24, 243, 240; 709/226, 230, 232, 236, 245, 216, 217, 219

(56) References Cited

U.S. PATENT DOCUMENTS

| 4,354,260 | A | * | 10/1982 | Planzo ........................ 368/10 |
| 5,278,789 | A | | 1/1994 | Inoue et al. ............ 365/189.01 |
| 5,644,784 | A | | 7/1997 | Peek ............................. 710/24 |
| 5,842,038 | A | | 11/1998 | Williams et al. ............... 710/5 |
| 5,909,686 | A | * | 6/1999 | Muller et al. ............. 707/104.1 |
| 5,920,867 | A | * | 7/1999 | Van Huben et al. ........ 707/101 |
| 5,933,838 | A | * | 8/1999 | Lomet ........................ 707/202 |
| 5,938,736 | A | * | 8/1999 | Muller et al. ............... 709/243 |
| 5,956,714 | A | * | 9/1999 | Condon ........................ 707/8 |
| 6,035,297 | A | * | 3/2000 | Van Huben et al. ............ 707/8 |
| 6,119,196 | A | | 9/2000 | Muller et al. ............... 710/243 |
| 6,122,669 | A | * | 9/2000 | Crayford .................... 709/232 |
| 6,173,384 | B1 | | 1/2001 | Weaver ....................... 711/216 |
| 6,223,175 | B1 | * | 4/2001 | George et al. ................. 707/6 |
| 6,460,120 | B1 | * | 10/2002 | Bass et al. .................. 711/148 |
| 6,553,000 | B1 | * | 4/2003 | Ganesh et al. ............. 370/235 |
| 6,631,367 | B2 | * | 10/2003 | Teng et al. .................... 707/3 |
| 6,643,641 | B1 | * | 11/2003 | Snyder .......................... 707/4 |

FOREIGN PATENT DOCUMENTS

EP          0752796          1/1997

OTHER PUBLICATIONS

Yu–Sheng Lin and C. Bernard Shung, "Queue Management for Shared Buffer and Shared Multi–buffer ATM Switches," XP 000621335, 1996 IEEE, publication date Mar. 24, 1996, pp 688–695.

* cited by examiner

Primary Examiner—Shahid Alam
(74) Attorney, Agent, or Firm—Squire, Sanders & Dempsey LLP

(57) ABSTRACT

A network device including a memory, a queue management unit, a memory management unit, and a search switching unit. The memory includes a plurality of memory banks. The queue management unit is configured to receive a plurality of search requests and to prioritize the search requests. The memory management unit is coupled to the queue management unit and the memory, and is configured to initiate a plurality of binary searches based on the plurality of search requests. Each binary search is executed simultaneously in different banks of the plurality of memory banks. The search switching unit is coupled to the memory and the memory management unit, and is configured to switch each binary search from one memory bank of to another memory bank after a predetermined number of search steps are performed by each binary search.

31 Claims, 11 Drawing Sheets

Fig. 4

PROTOCOL CHANNEL MESSAGES

| 30 | 28 | | | 26 | 24 | 22 | 20 | 18 | 16 | 14 | 12 | 10 | 8 | 6 | 4 | 2 | 0 |
|----|----|---|---|----|----|----|----|----|----|----|----|----|---|---|---|---|---|
| OP CODE | I P | I P | P X | RESERVED | NXT CELL | SRC DEST PORT | | | COS | J | S E | CR C | P | 0 | | LEN | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| RESERVED | | | | | | | BC/MC PORTBITMAP | | | | | | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| U | RES | | | | | | UNTAGGED PORTBITMAP/SRC PORT NUMBER (BIT0..5) | | | | | | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| CPU OPCODES | | | | | | | | TIME STAMP | | | | | | | |

| | |
|---|---|
| LINE 0 → | FC\|LC\|BC/MC\|CPY_CNT(5b)\|CELL_LENGTH(7b)\|CRC(2b)\|NC_HEADER(16b)\|SRC COUNT(6)\|IPX\|IP\|TIME_STAMP(14b)\|O BITS(2b)\|P\|NEXT CELL LEN(2b)\|CPU OPCODE(4b)\|CELL_DATA(0-9B) |
| LINE 1 → | CELL_DATA (10-27) BYTES |
| LINE 2 → | CELL_DATA (28-45) BYTES |
| LINE 3 → | CELL_DATA (46-63) BYTES |

Fig. 8

BINARY SEARCH ENGINE AND METHOD

REFERENCE TO RELATED APPLICATIONS:

This application claims priority of United States Provisional Patent Application Serial No. 60/273,517 entitled "Binary Search in Four Parallel Banks," filed on Mar. 7, 2001, the contents of which are hereby incorporated by reference.

BACKGROUND OF THE INVENTION

1. Field of the Invention

The invention relates to systems and methods for searching memory in a network device. In particular, the invention relates to systems and methods of searching parallel memory banks simultaneously within a network device, such as a high performance network switch.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches," which operate with various types of communication media. Thickwire, thinwire, twisted pair, and optical fiber are examples of media which have been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Current basic Ethernet wirespeeds typically range from 10 Megabits per second (Mps) up to 10,000 Mps, or 10 Gigabits per second. As speed has increased, design constraints and design requirements have become more and more complex with respect to following appropriate design and protocol rules and providing a low cost, commercially viable solution.

Competition and other market pressures require the production of more capable network devices that cost less. Increased network and device speed is required by customers.

Network performance, i.e., increased device speed and decreased data packet latency, is directly related to the time that it takes for devices to search memory in conjunction with relaying a packet, e.g. a switch searching memory tables for destination addresses, rules, etc. Thus, in order to support high performance network solutions, new and improved systems and methods are needed for searching memory banks within network devices, such as within a high performance switch.

SUMMARY OF THE INVENTION

Provided is a network device, such as a switch, including a memory, a queue management unit, a memory management unit, and a search switching unit. The memory comprises a plurality of memory banks. The queue management unit is configured to receive a plurality of search requests and to prioritize the search requests. The memory management unit is coupled to the queue management unit and is configured to initiate a plurality of binary searches based on the plurality of search requests. Each binary search is executed simultaneously in different banks of the plurality of memory banks. The search switching unit is coupled to the memory and the memory management unit and is configured to switch each binary search from one memory bank to another memory bank after a predetermined number of search steps are performed by each binary search, until a match is made in each binary search.

According to another embodiment of the present invention, provided is a method of searching a memory of a network device. The method includes a step of providing a network device comprising a memory to be searched. The memory comprises a plurality of memory banks. The method also includes a step of receiving a plurality of binary search requests at the network device. The method includes the step of initiating a plurality of binary searches in the plurality of memory banks at a same time. The plurality of binary searches are based on the plurality of binary search requests. At a predetermined step in each search of the plurality of binary searches, each search is switched to a different memory bank of the plurality of memory banks. The method also includes the step of continuing switching each binary search to a different memory bank of the plurality of memory until a match is made in each binary search, or until all banks have been read.

According to another embodiment of the present invention, provided is a network device including a memory means, a queue management means, a memory management means and a search switching means. The memory means is for maintaining data. The memory means comprises a plurality of memory banks means. The queue management means is for receiving a plurality of search request means and for prioritizing the search request means. The memory management means is for initiating a plurality of binary search means based on the plurality of search request means. Each binary search means is for simultaneously searching different banks means of the plurality of memory banks means. The search switching means is for switching each binary search means from one memory bank means to another memory bank means after a predetermined number of search steps are performed by each binary search means, until a match is made in each binary search means, or until all banks means have been covered.

BRIEF DESCRIPTION OF THE DRAWINGS

The objects and features of the invention will be more readily understood with reference to the following description and the attached drawings, wherein:

FIG. 4 illustrates P-channel message types according to an embodiment of the present invention;

FIG. 8 illustrates an operational diagram of an EPIC module;

Figure 1:
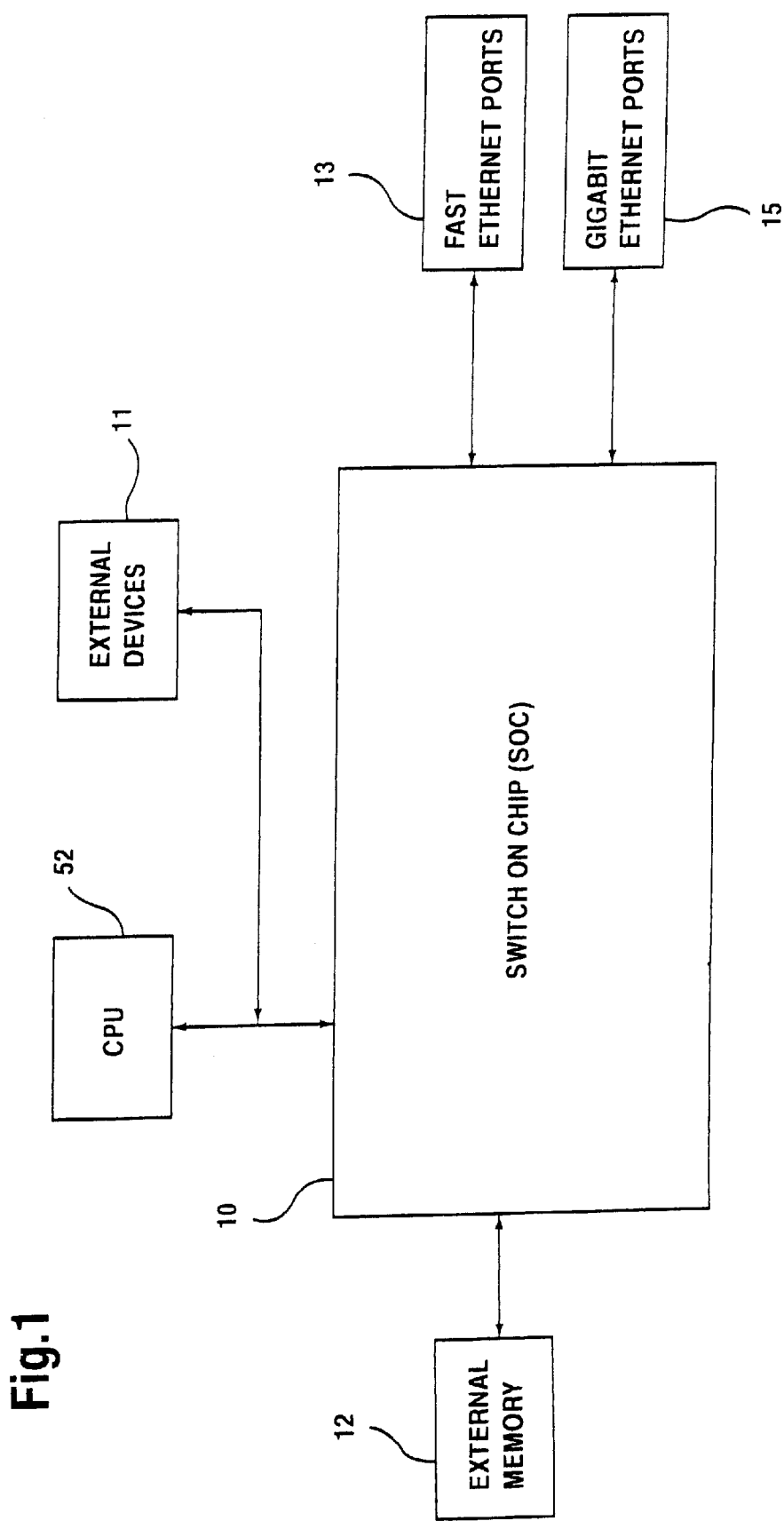
FIG. 1 is a general block diagram of an exemplary network device according to the invention.

DETAILED DESCRIPTION OF THE PREFERRED EMBODIMENTS:

FIG. 1 is a basic block diagram of an exemplary high-speed network device to which the present invention is applicable. A switch is chosen as an exemplary device because the performance of the switch is very closely related to the speed of table look-ups. An exemplary configuration of a network switch is shown. A switch-on-chip (SOC) 10 is functionally connected to external devices 11, external memory 12, fast ethernet ports 13, and gigabit ethernet ports 15. For the purposes of this discussion, fast ethernet ports 13 will be considered low speed ethernet ports, since they may be capable of operating at speeds ranging from 10 Mbps to 100 Mbps in this example, while the gigabit ethernet ports 15, which are high speed ethernet ports, are capable of operating at 1000 Mbps or higher in this example, and preferably 2500 Mbps. External devices 11 could include other switching devices for expanding switching capabilities, or other devices as may be required by a particular application. External memory 12 can be additional off-chip memory, which is in addition to internal memory (on-chip) which is located on SOC 10, which will be discussed below. CPU 52 can be used as desired to program SOC 10 with rules which are appropriate to control packet processing. However, once SOC 10 is appropriately programmed or configured, SOC 10 operates, as much as possible, in a free running manner without communicating with CPU 52. CPU 52 does not control every aspect of the operation of SOC 10, because CPU 52 performance requirements in this example, at least with respect to SOC 10, are fairly low. A less powerful and therefore less expensive CPU 52 can therefore be used when compared to other network switches. As also will be discussed below, SOC 10 utilizes external memory 12 in an efficient manner so that the cost and performance requirements of memory 12 can be reduced. Internal memory on SOC 10, as will be discussed below, could also be configured to maximize switching throughput and minimize costs.

It should be noted that port speeds described are merely exemplary and ports may be configured to handle a variety of speeds faster and slower.

Figure 2:
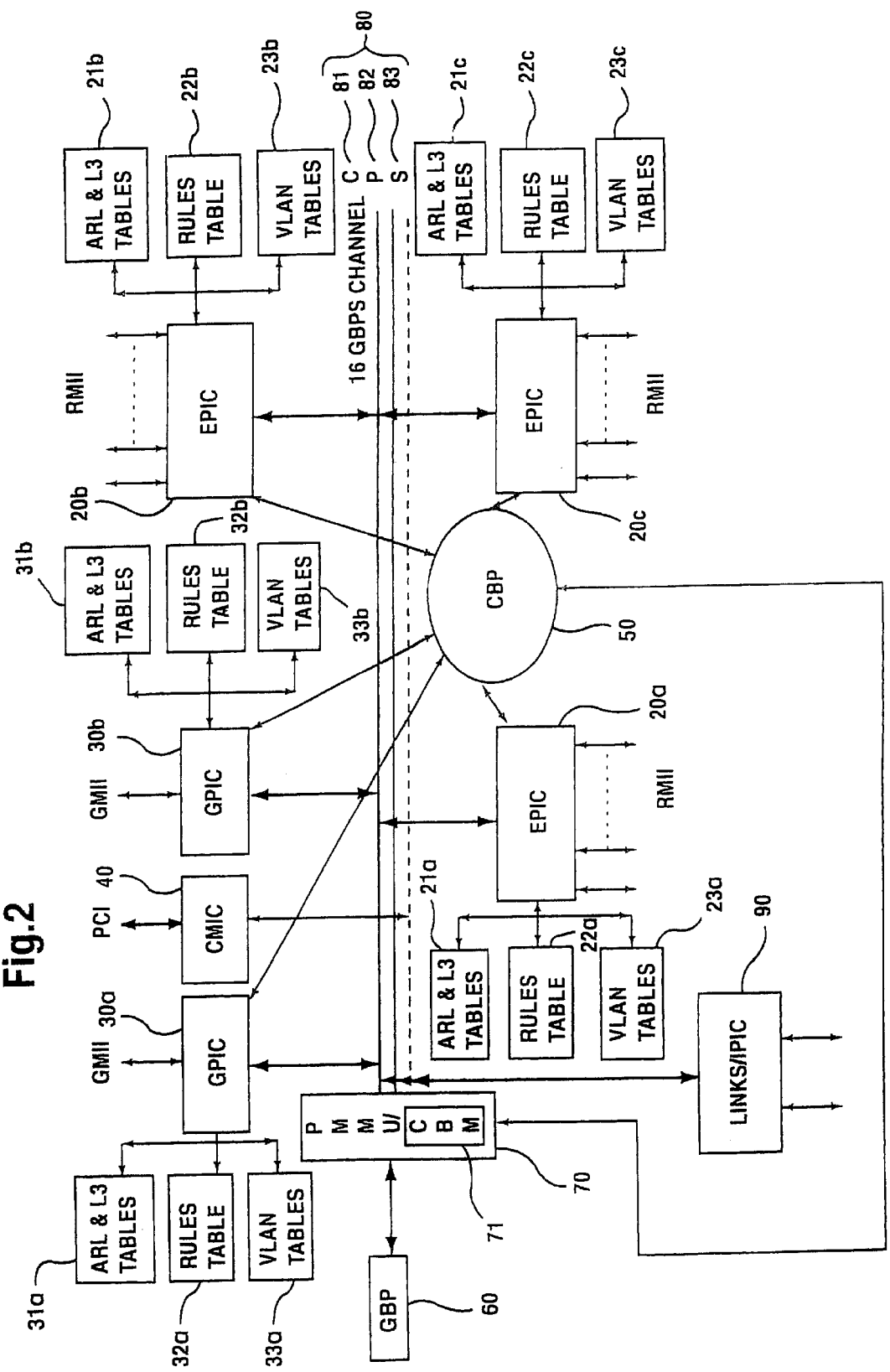
FIG. 2 is a detailed block diagram of a network switch according to the invention.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10. However, other switch configurations or network device configurations may be utilized to produce the present invention.

SOC 10 may include a plurality of Ethernet Port Interface Controllers (EPIC) 20a, 20b, 20c, etc., a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70, including a Common Buffer Manager (CBM) 71, a Gap Ram 85, which may be part of the ARL, and a system-wide bus structure referred to as CPS channel 80. The PMMU 70 includes memory management means and communicates with external memory 12, which includes a Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one configuration, this interconnect can be in the form of an interconnect port interface controller (IPIC) 90, which is capable of interfacing CPS channel 80 to external devices 11 through an extendible high speed interconnect link. As will be discussed below, each EPIC 20a, 20b, and 20c, generally referred to as EPIC 20, and GPIC 30a and 30b, generally referred to as GPIC 30, are closely interrelated with appropriate address resolution logic and layer three switching tables 21a, 21b, 21c, 31a, 31b, rules tables 22a, 22b, 22c, 31a, 31b, and VLAN tables 23a, 23b, 23c, 31a, 31b. These tables will be generally referred to as 21, 31, 22, 32, 23, 33, respectively. These tables, like other tables on SOC 10, can be implemented in silicon as two-dimensional arrays.

EPIC 20 may support a number of fast ethernet ports 13 (8 are shown as an example), and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast ethernet, wherein the network is capable of negotiating a highest communication speed between a source and a destination based on the capabilities of the respective devices. The communication speed can vary, as noted previously, for example, between 10 Mbps and 100 Mbps, as an example. Auto-negotiation capability, therefore, is built directly into each EPIC 20 or GPIC 30 module. The address resolution logic (ARL) and layer three tables (ARL/L3) 21a, 21b, 21c, rules table 22a, 22b, 22c, and VLAN tables 23a, 23b, and 23c are configured to be part of, or interface with the associated EPIC in an efficient and expedient manner, in order to support wirespeed packet flow. The on-chip memory which is searched in accordance with the present invention may comprise these tables, as is described below in more detail.

Each EPIC 20 and GPIC 30 has separate ingress and egress functions. On the ingress side, self-initiated and CPU-initiated learning of level 2 address information can occur. Address resolution logic (ARL) is utilized to assist in this task. Address aging is built in as a feature, in order to eliminate the storage of address information which is no longer valid or useful. The EPIC and GPIC can also carry out layer 2 mirroring. A fast filtering processor (FFP) 141 (see FIG. 3) may be incorporated into the EPIC, in order to accelerate packet forwarding and enhance packet flow. The EPIC, GPIC, and FFP may request searches in accordance with the present invention.

The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 can have a separate ingress submodule 14 associated therewith. From an implementation perspective, however, in order to minimize the amount of hardware implemented on the single-chip SOC 10, common hardware elements in the silicon can be used to implement a plurality of ingress submodules on each particular module. The configuration of SOC 10 discussed herein enables concurrent lookups and filtering. Layer two lookups, Layer three lookups and filtering occur simultaneously to achieve a high level of performance, which are described in better detail below. On the egress side, the EPIC and GPIC are capable of supporting packet polling based either as an egress management or class of service (COS) function. Rerouting/scheduling of packets to be transmitted can occur, as well as head-of-line (HOL) blocking notification, discussed later herein, packet aging, cell reassembly, and other functions associated with ethernet port interface.

Each GPIC 30 is similar to each EPIC 20, but in this embodiment, supports only one 2.5 gigabit ethernet port, and utilizes common ARL table with specific slots within a scheduler dedicated to each port, rather than utilizing an ARL table for each port. The present invention is not meant to be limited to this configuration, however. Additionally, instead of an RMII, each GPIC port interfaces to the network medium utilizing a gigabit media independent interface (GMII).

A CMIC 40 can act as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1 q VLAN tables, layer three tables, rules tables, CBP address and data memory, as well as GBP address and data memory. Optionally, the CMIC 40 can include DMA support, DMA chaining and scatter-gather, as well as master and target PCI64.

A network device, such as the switch of the present embodiment, may have various memory, such as on-chip or off-chip memory, that may be searched according to the present invention. Accordingly, described below are exemplary memory devices and functions which may be implemented in the switch of the present embodiment. However, the present invention is not intended to be limited to the described memory devices and functions.

Common buffer memory pool or CBP 50 can be considered to be on-chip data memory. In one configuration, the CBP 50 can be first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 can handle receiving search requests and queue management, and can be responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management. The preceding discussion is an exemplary configuration of an exemplary device, and is not meant to limit the present invention. Accordingly, other functions or facilities may be implemented as memory management units or queue management units in accordance with the present invention.

Global memory buffer pool or GBP 60 can act as a second level memory, and can be located on-chip or off chip. In one configuration, GBP 60 is located off chip with respect to SOC 10. When located off-chip, GBP 60 is considered to be a part of or all of external memory 12. As a second level memory, the GBP can be high speed SRAMs, or can be a slower less expensive memory such as DRAM or any other suitable memory type. The GBP can be tightly coupled to the PMMU 70, and operates like the CBP in that packets are stored as cells. For broadcast and multicast messages, only one copy of the packet is stored in GBP 60.

As shown in the figure, PMMU 70 can be located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control. Gap RAM 85 may be part of PMMU or may be anywhere on SOC 10 accessible by the various functions performing table look-up and searches. The function of Gap RAM 85 will be described in detail below.

As shown in FIG. 2, the CPS channel 80 can be actually three separate channels, referred to as the C-channel, the P-channel, and the S-channel. The C-channel can be 128 bits wide and run at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel can be 32 bits wide and run at 132 MHz.

The S or sideband channel can run, for example, at 132 MHz and be 32 bits wide. Any suitable width and speed is feasible. The S-channel can be used for functions such as for conveying Port Link Status, receive port full, port statistics, ARL table synchronization, memory and register access to CPU and other CPU management functions, relaying rate control messages and global memory full and common memory full notification.

Figure 3:
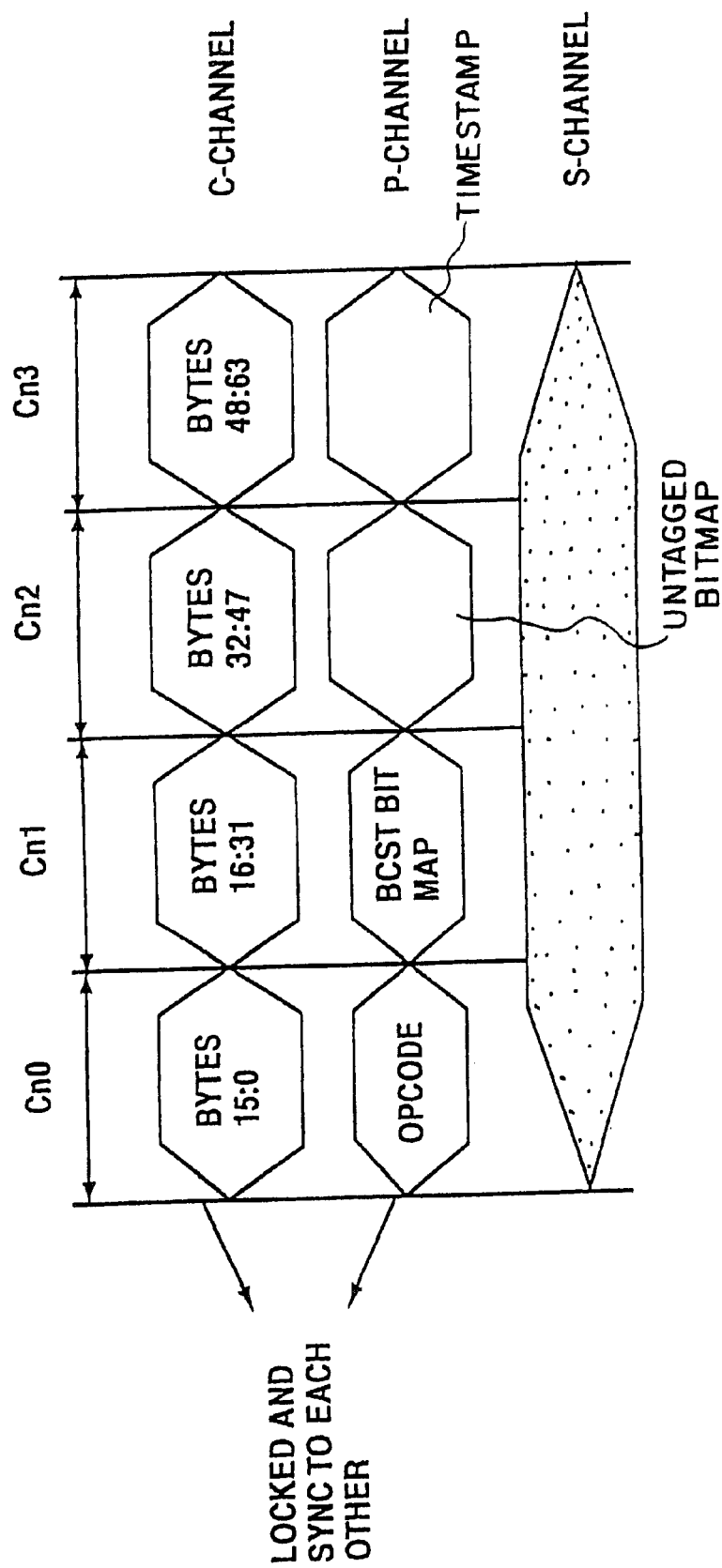
FIG. 3 illustrates the data flow on the CPS channel of a network switch according to an embodiment of the present invention.

A proper understanding of the operation of SOC 10 requires a proper understanding of the operation of CPS channel 80. Referring to FIG. 3, it can be seen that in SOC 10, on the ingress, packets are sliced by an EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In this example of SOC 10, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Arbitration for the CPS channel occurs out of band. Every module (EPIC, GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and EPICs 20 and GPICs 30 share equal access to the C-channel on a round robin basis. FIGS. 4A and 4B illustrate a C-channel arbitration mechanism wherein section A is the PMMU, and section B consists of two GPICs and three EPICs. The sections alternate access, and since the PMMU is the only module in section A, it gains access every other cycle or burst, which may be 4–5 cycles. The modules in section B, as noted previously, obtain access on a round robin basis.

Protocol or P-Channel

Referring once again to the protocol or P-channel, a plurality of messages can be placed on the P-channel in order to properly direct flow of data flowing on the C-channel. Supposing P-channel 82 is 32 bits wide, and a message typically requires 128 bits, four smaller 32 bit messages can be put together in order to form a complete P-channel message. The following list identifies some examples of the fields and function and examples of the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port Field. The untagged bits identifies the egress ports which will strip the tag header, and the source port bits identifies the port number upon which the packet has entered the switch;

U Bit—1 bit long—For a particular Opcode selection (0×01, this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 $\mu$sec.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 4.

An early termination message is used to indicate to CBM 71 that the current packet is to be terminated. During operation, as discussed in more detail below, the status bit (S) field in the message is set to indicate the desire to purge the current packet from memory. Also, in response to the status bit, all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid in this example for the last cell of a packet being transmitted as defined by the E bit field of the message.

Last, the time stamp field of the message in this example has a resolution of 1 $\mu$s and is valid only for the first cell of the packet defined by the S bit field of the message. A cell is defined as the first cell of a received packet when the S bit field of the message is set to a logical one value.

The C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 can be a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages may include port status information, including port link status, receive port full, and port statistics, ARL table 22 synchronization, CPU 52 access to GBP 60 and CBP 50 memory buffers and SOC 10 control registers, and memory full notification corresponding to GBP 60 and/or CBP 50.

Figure 5:
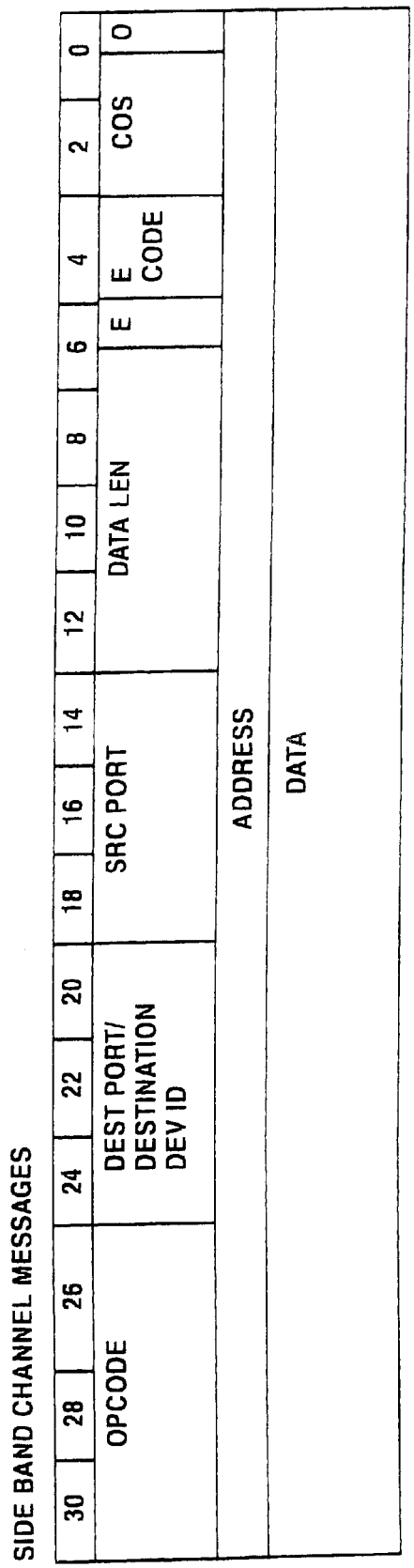
FIG. 5 illustrates a message format for S channel message types according to an embodiment of the present invention.

FIG. 5 illustrates an exemplary message format for an S channel message on S channel 83. The message is formed of four 32-bit words; the bits of the fields of the words are defined as follows:

- Opcode—6 bits long—Identifies the type of message present on the S channel;
- Dest Port—6 bits long—Defines the port number to which the current S channel message is addressed;
- Src Port—6 bits long—Defines the port number of which the current S channel message originated;
- COS—3 bits long—Defines the class of service associated with the current S channel message; and
- C bit—1 bit long—Logically defines whether the current S channel message is intended for the CPU 52.
- Error Code—2 bits long—Defines a valid error when the E bit is set;
- DataLen—7 bits long—Defines the total number of data bytes in the Data field;
- E bit—1 bit long—Logically indicates whether an error has occurred in the execution of the current command as defined by opcode;
- Address—32 bits long—Defines the memory address associated with the current command as defined in opcode;
- Data—0-127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the SOC 10 can support fast Ethernet ports, gigabit ports, and extendible interconnect links as discussed above. The SOC configuration can also be "stacked" or "linked", thereby enabling significant port expansion capability. Once data packets have been received by SOC 10, sliced into cells, and placed on CPS channel 80, stacked SOC modules can interface with the CPS channel and monitor the channel, and extract appropriate information as necessary. As will be discussed below, a significant amount of concurrent lookups and filtering occurs as the packet comes in to ingress submodule 14 of an EPIC 20 or GPIC 30, with respect to layer two and layer three lookups, and fast filtering.

Table management may also be achieved through the use of the CPU 52. CPU 52, via the CMIC 40, can provide the SOC 10 with software functions which result in the designation of the identification of a user at a given port 24. As discussed above, it is undesirable for the CPU 52 to access the packet information in its entirety since this would lead to performance degradation. Rather, the SOC 10 is programmed by the CPU 52 with identification information concerning the user. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21a. If the packet is addressed to one of the layer three (L3) switches of the SOC 10, then the ingress sub-module 14a performs the L3 and default table lookup. Once the destination port has been determined, the EPIC 20a sets a ready flag in the dispatch unit 18a which then arbitrates for C channel 81.

The C channel 81 arbitration scheme, as discussed previously and as illustrated in FIGS. 4A and 4B, is Demand Priority Round-Robin. Each I/O module, EPIC 20, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If EPIC modules 20a, 20b, 20c, and GPIC modules 30a and 30b, and CMIC 40 simultaneously request C channel access, then access is granted in round-robin fashion. For a given arbitration time period each of the I/O modules would be provided access to the C channel 81. For example, each GPIC module 30a and 30b would be granted access, followed by the EPIC modules, and finally the CMIC 40. After every arbitration time period the next I/O module with a valid request would be given access to the C channel 81. This pattern would continue as long as each of the I/O modules provide an active C channel 81 access request.

If all the I/O modules, including the PMMU 70, request C channel 81 access, the PMMU 70 is granted access as shown in FIG. 4B since the PMMU provides a critical data path for all modules on the switch. Upon gaining access to the channel 81, the dispatch unit 18a proceeds in passing the received packet 112, one cell at a time, to C channel 81.

Referring again to FIG. 3, the individual C, P, and S channels of the CPS channel 80 are shown. Once the dispatch unit 18a has been given permission to access the CPS channel 80, during the first time period Cn0, the dispatch unit 18a places the first 16 bytes of the first cell 112a of the received packet 112 on the C channel 81. Concurrently, the dispatch unit 18a places the first P channel message corresponding to the currently transmitted cell. As stated above, the first P channel message defines, among other things, the message type. Therefore, this example is such that the first P channel message would define the current cell as being a unicast type message to be directed to the destination egress port 21c.

During the second clock cycle Cn1, the second 16 bytes (16:31) of the currently transmitted data cell 112a are placed on the C channel 81. Likewise, during the second clock cycle Cn1, the Bc/Mc Port Bitmap is placed on the P channel 82. For example, the first search cycle of an Layer-2 lookup may occur a few cycles after receiving a number of bytes of date (packet) at the EPIC, depending on the speed of the port. EPIC configuration may cause further delay.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112a of the incoming packet 112 is placed on the CPS channel 80 the PMMU 70 determines whether the cell is to be transmitted to an egress port 21 local to the SOC 10.

If the PMMU 70 determines that the current cell 112a on the C channel 81 is destined for an egress port of the SOC 10, the PMMU 70 takes control of the cell data flow.

Figure 6:
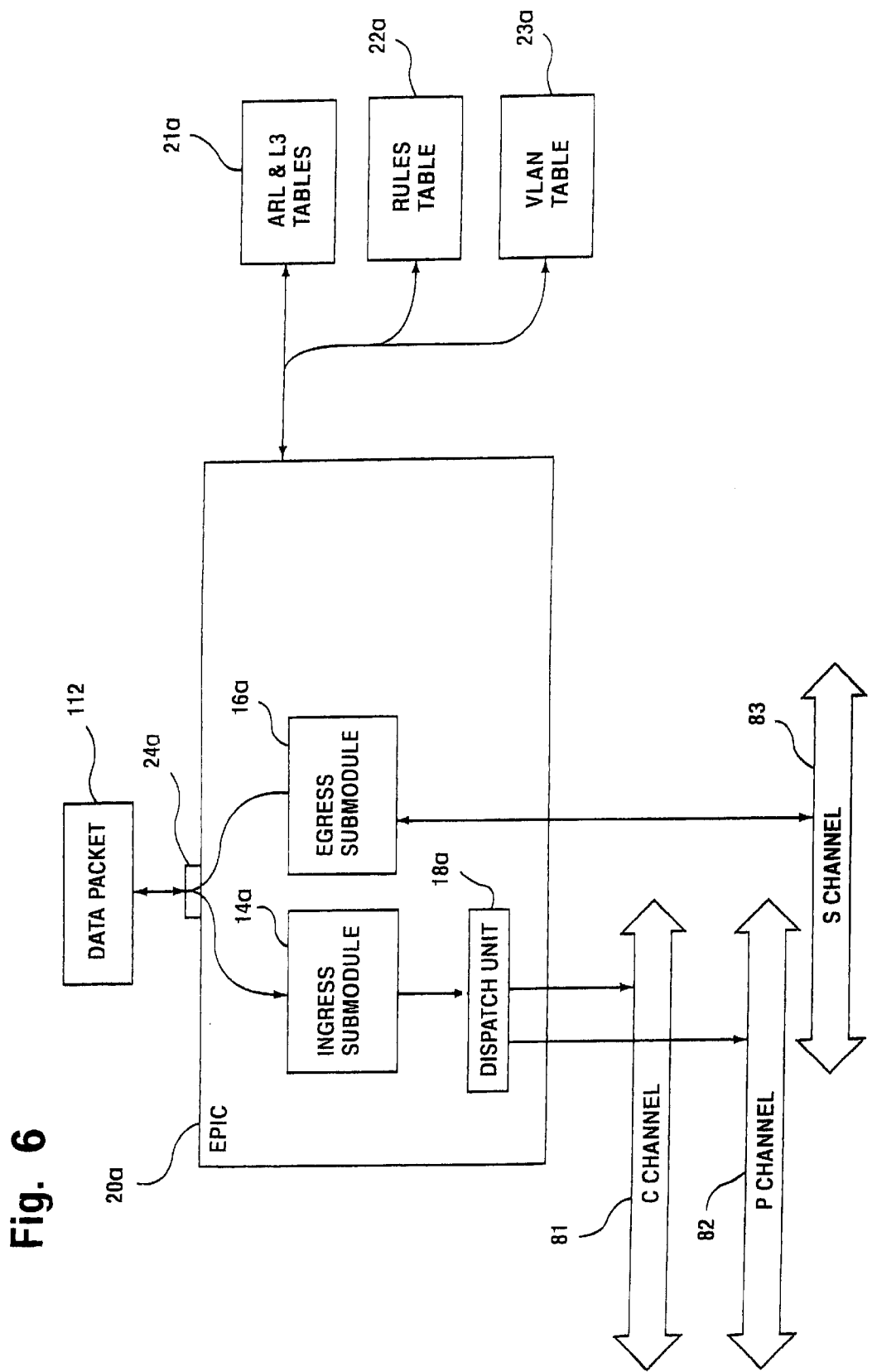
FIG. 6 is a detailed view of elements of the PMMU of a switch according to an embodiment of the present invention.

FIG. 6 illustrates, in more detail, the functional egress aspects of PMMU 70. PMMU 70 includes CBM 71, and interfaces between the GBP, CBP and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112a and 112b.

Figure 7:
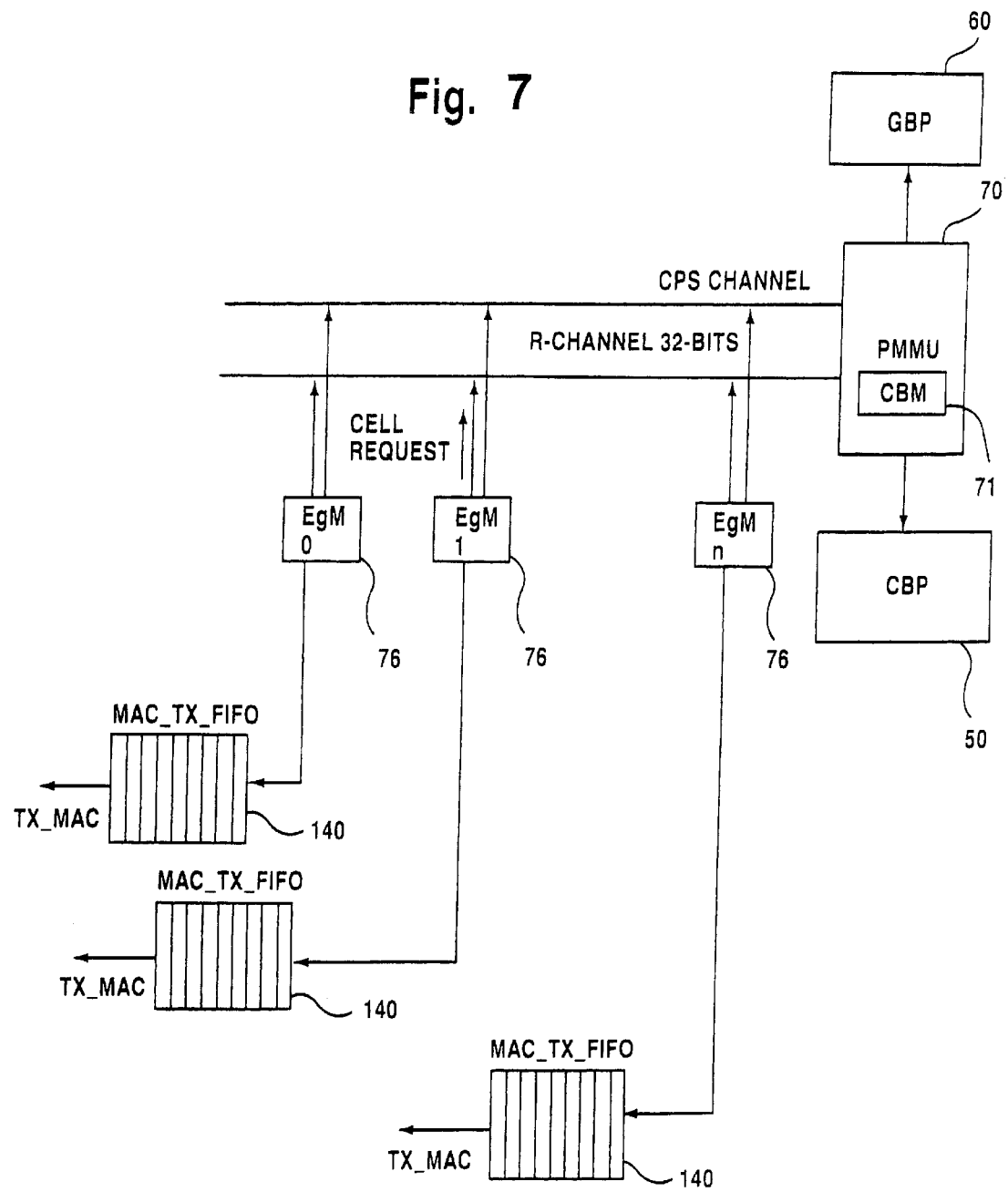
FIG. 7 illustrates the CBM cell format according to an embodiment of the present invention.

CBM 71, in summary, performs, the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 7; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within PMMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71 within the PMMU 70.

When PMMU 70 determines, e.g., by a table look-up (i.e., a search described further below), that cell 112a is destined for an appropriate egress port on SOC 10, PMMU 70 controls the cell flow from CPS channel 80 to CBP 50. As the data packet 112 is received at PMMU 70 from CPS 80, CBM 71 determines whether or not sufficient memory is available in CBP 50 for the data packet 112. A free address pool (riot shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by PMMU 70, CBM 71 assigns cell pointers. The initial pointer for the first cell 112a points to the egress manager 76 which corresponds to the egress port to which the data packet 112 will be sent after it is placed in memory. In the example of FIG. 8, packets come in to port 24a of EPIC 20a, and are destined for port 24c of EPIC 20c. For each additional cell 112b, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24c. Once the packet is fully written into CBP 50, a corresponding CBP Packet Identifier (CPID) is provided to the appropriate egress manager 76; this CPID points to the memory location of initial cell 112a. The CPID for the data packet is then used when the data packet 112 is sent to the destination egress port 24c. In actuality, the CBM 71 maintains two buffers containing a CBP cell pointer, with admission to the CBP being based upon a number of factors. An example of admission logic for CBP 50 will be discussed below with reference to FIG. 12.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112a, 112b of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

As described above, in support of high speed switching, SOC 10 is configured to perform many table look-ups, such as against the ARL or rules tables. For example, as described above, when a packet is received at a port, the egress 30 is configured to request an appropriate look-up in order to determine the destination address. The PMMU 70 then accesses the corresponding tables on-chip and performs a search, for example, for a rule, mask, address, etc. These table searches are directly related to the performance of the switch, and it is important that such searches be performed as quickly and efficiently as possible. Binary searches are an efficient and quick method of searching within a high performance switch.

A brief discussion of binary searching according to the present invention is provided in order to better understand parallel searching, which is discussed in detail below.

Figure 9:
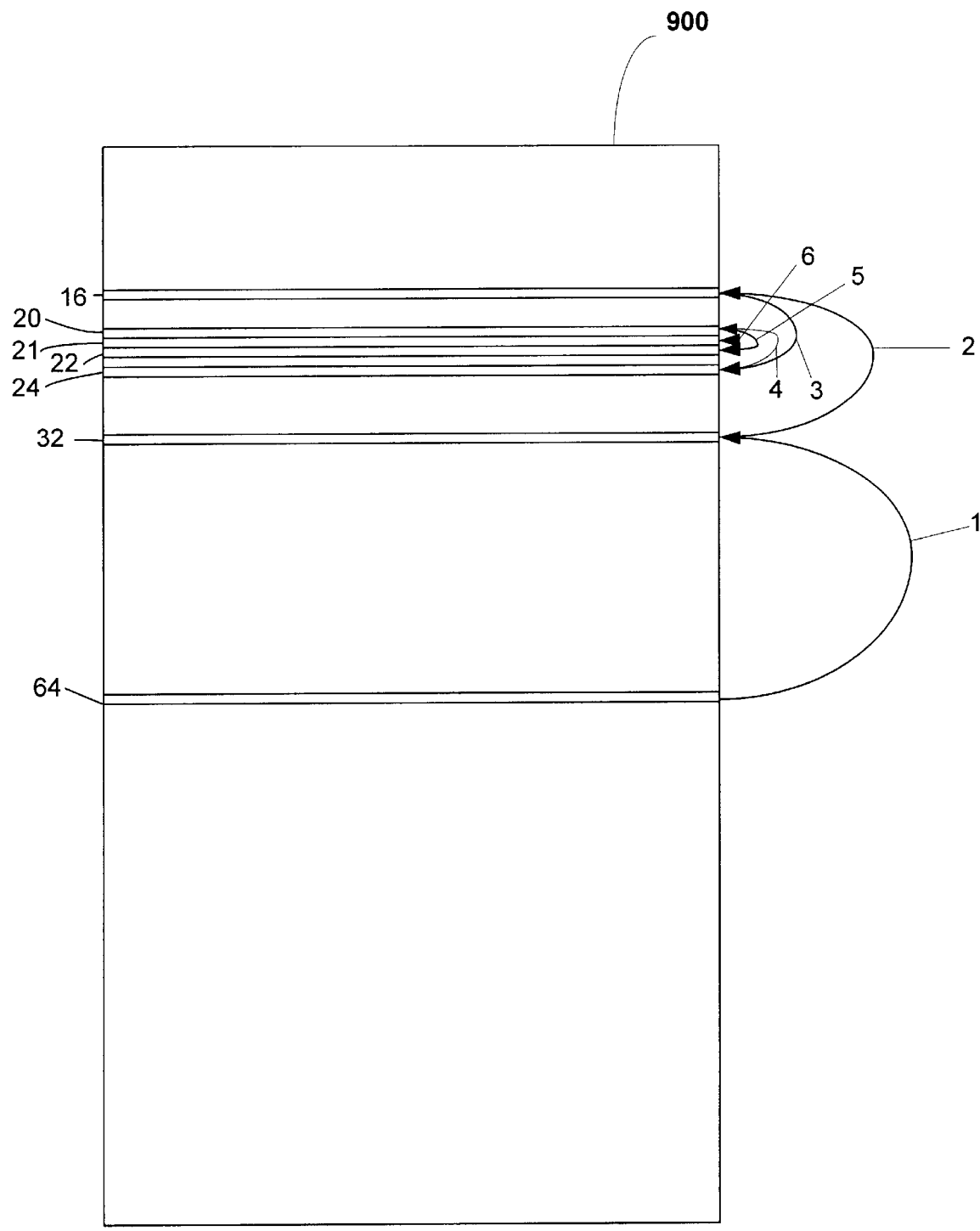
FIG. 9 illustrates an exemplary table and a binary search.

Referring to FIG. 9, shown is an exemplary table 900 to be searched, which could be any of the on-chip tables already described above. Assuming that table 900 is sorted in an order and indexed or keyed, a binary search is extremely efficient. Binary search steps are illustrated by curved arrows. First, a search begins in the center of a memory bank (unless it's indexed). As an example, the table has 128 rows or memory units (word lines, etc.). Therefore, the search begins at row 64. The search engine or facility controlling the search, such as the PMMU 70 or CBM 71, compares the value stored in row 64 against the search criteria. If the value is greater than or less than the search criteria, then the search jumps up or down, respectively, a number of rows equal to $2^{(m-n)}$, where m is logarithm of the number of rows in the table, and n is the number of the current search step. For example, in a 128 row table, step 1 begins at row $\mathbf{64}=2^{(m-n)}=2^{7-1}=2^6$. At step 2, the next jump is plus or minus $2^5=32$, therefore, the search jumps down to 32 or up to 96 depending on the result of the comparison.

The search continues jumping until a match is found, that is, until the value not higher or low than the search criteria. If no match is found, the search continues until all the banks are checked. As an example, if the match is in a row 21, the process steps from 64 to 32 at step 1, because 21 is less than 64. Next, at step 2, the search jumps from 32 to 16. Since 21 is greater than 16, the search then jumps from 16 to 20, then from 20 to 22, and finally from 22 to back to 21, at step 6. Note the search takes a total of six steps. Considering that the memory bank contains 128 rows, which could require a full scan of 128 steps to find a match, a binary search is much more efficient.

Figure 10:
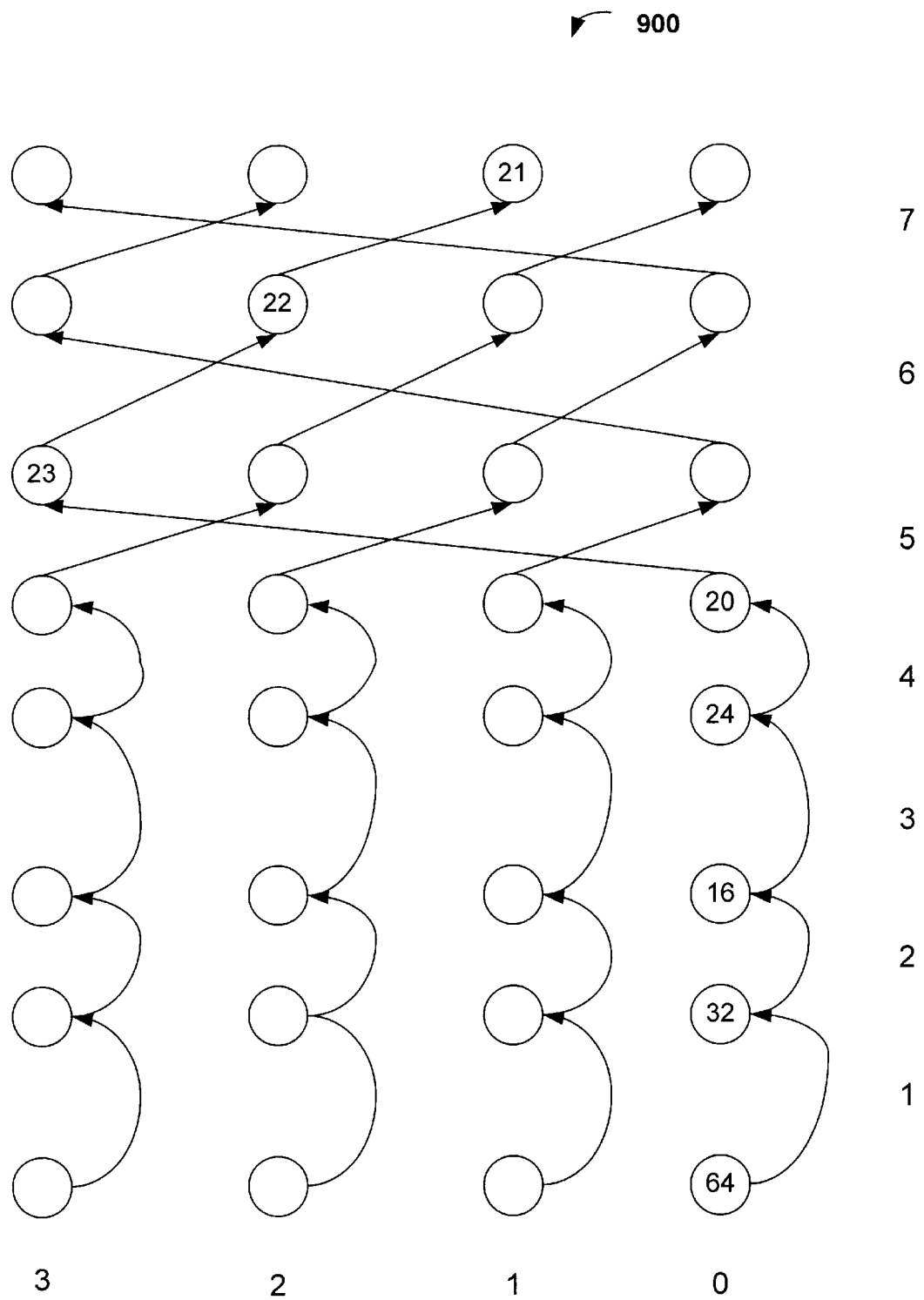
FIG. 10 illustrates a number of parallel searches performed in parallel banks according to an embodiment of the present invention.

In order to further increase device speed, each table may be divided into a series of parallel memory banks, for example, four memory banks. Referring to FIG. 10, shown is a diagram of table 900 divided into 4 parallel memory banks. The table may be any size, but is preferably 128 or 256 rows. In a preferred embodiment, each row contains 86 bits, and therefore, a table with 256 rows and having four banks would be 5.375 kbytes.

A number of parallel searches are shown being performed in parallel banks according to an embodiment of the present invention. Banks 0, 1, 2 and 3 are of equal size and together make up a table 900. It is assumed that data, such as address resolution or rules data, is sorted during the storing process or by another means, and is therefore stored in a sorted order. As an example, the sorted order could be from right to left, top to bottom. Each circle represents a search step or a hop where the search process makes a comparison between the search criteria and the value of the data stored at a position in the member bank. Each circle also represents a logical row or memory location, but does not represent a physical location in relation to the table. As explained above, each search can be a binary search so that each hop is performed at a number on the order of two which is reduced at each step until a match is found or the search is exhausted. As an example, the previous search can be duplicated and represented as one of the parallel searches to help explain the process. Physical cell locations (e.g., row numbers) are displayed inside a number of circles to demonstrate an exemplary search.

If it is assumed that the memory bank comprises four rows of 128, after a binary search performs five steps without a match, then the value must be in another memory bank. Accordingly, after the fifth step, the search must be shifted from one memory bank to another until the match is found. This is because mathematically, if a match has not been made, the match must be in another bank.

At the point of switching banks, searches can be controlled so that no row in a memory bank is read by two search processes at the same time. This is because in a single port memory device, the same memory location cannot be read more than once at a time. Therefore, since up to four searches may be occurring at one time, an order must be established for switching a search from memory bank to memory bank in order to avoid a collision (i.e., more than one read at a location at the same time). Shown here, memory banks 1–3 are shifted one bank right while the memory bank 0 is shifted 3 banks left (to bank 3) at step 5. The same shift is done at steps 6 and 7. The idea is to check the remaining locations in each unchecked row to find a match without having a collision with the other parallel searches which are happening contemporaneously. The switching order shown here is only exemplary and is not meant to limit the present invention.

Also, in order to avoid collisions, all searches are preferably started at the same time. In order to do this, searches are initiated at the beginning of a search cycle (a clock cycle designated for processing searches, such as the clock cycle on C-channel), and then no new searches are begun until all searches are completed or otherwise terminated. Therefore, if five searches are requested at a given time, four searches will begin at the next available search cycle, and the fifth search will not begin until all four searches are terminated. However, if only three searches are in a queue, all three searches will begin at the next available search cycle. Since each search is begun in a separate memory bank, and all searches without reaching a match by step 5 will switch into separate memory banks, collisions will be avoided.

To further reduce latency (i.e., improve performance), some entries at the binary boundary can be cached. For example, if entry 64 is cached, the bank to be searched could be divided into two halves of 64 entries and overall latency could be reduced by another cycle. However, for every cached entry at a binary boundary, 4 gap cells are created. For example, cells 0, 1, 2, 3, 65, 66, and 67 are gap cells that would also need extra access to complete the search. Mathematically, these cells cannot be accessed by a binary search modified to read the boundary first, and therefore, would need to be read by some other fashion. This can be done by creating a separate small RAM, referred to above as Gap RAM 85, to cache the boundary cells and gap cells, collectively referred to hereafter as Gap Cells. Then, these Gap Cells can be simply read one after another in parallel to the binary searches.

As applied to a network device, the search engine may perform the initialization of searches, queue management, switching of searches, and other described functions for performing parallel searches in accordance with the present invention. Furthermore, these functions may be performed separately by a queue management unit, memory management unit, and search switching unit. In the exemplary switch described herein, portions of PMMU 70 and CBM 71 may be configured to handle search requests, queue management and memory management (e.g., binary searches and switching of searches). As an example, the PMMU 70 may initiate four binary searches at the beginning of a search cycle, and will not initiate any additional searches until all executing searches are terminated. The search engine, queue management unit, and/or memory management unit may be configured to accumulate search requests in a queue, and initiate and prioritize each search, for example, by port number in a switch. The search engine, queue management unit and/or memory management unit may also be configured to determine when all the initiated searches have terminated in order to initiate a new group of binary searches. Furthermore, the search engine or memory management unit may be configured to perform binary searches in accordance with the above-described methodology, based on the number of rows in memory and the number of memory banks. Similarly, the search engine or search switching unit may be configured to switch parallel searches from one memory bank to another memory bank at a predetermined search step based on the size of the memory and the number of rows and the number of memory banks. For example, described above the searches were required to be switched after five steps. Additionally, the search engine or search switching unit may be configured to control the switching of the search steps in order to eliminate collisions. Additionally, the search engine or memory management unit may be configured to read the gap RAM into each binary search.

Figure 11:
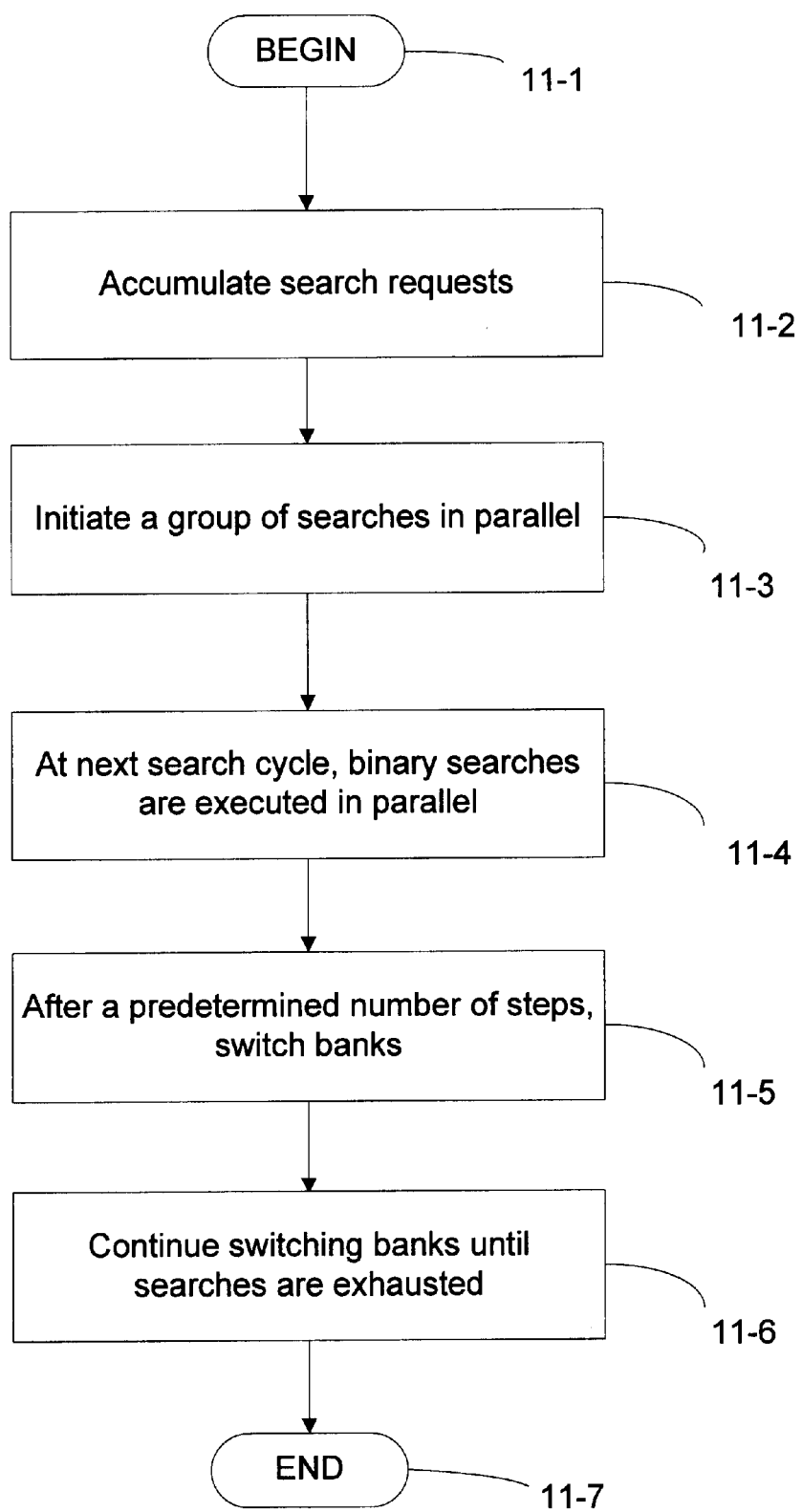
FIG. 11 is a flow chart of a method for searching memory having a plurality of memory banks in parallel according to an embodiment of the present invention.

Referring to FIG. 11, shown therein is a flow chart of a method for performing parallel searches in parallel banks according to the present invention. Processing begins at step S11-1. At step S11-2, search requests are accumulated into a queue to be initiated at the beginning of the next search cycle. For example, within a switch, as data packets are received at physical ports (i.e., network ports,) the ingresses of those ports receiving packets make a search request based on the destination address found in the preamble of the package.

Next, at step S11-3, a group of searches are initiated at the beginning of the search cycle, the group not being larger in number than the number of parallel memory banks to be searched. If more searches are in the queue than the number of parallel memory banks to be searched, then the search requests are prioritized in some manner and only the highest priority searches are initiated. For example, if there are four parallel memory banks within a switch, and six searches are requested from six different ports at the same time, only four searches will be initiated at the beginning of the next search cycle and may be selected based on port number or any other priority method. A search engine or memory management unit within a device, or a similar function block, can be configured as described above to perform search initiation, etc. Note that the searches need not come from different ports and may come from the same ports.

Gap Cells, including a binary boundary such as the 64th row, may be cached to further increase performance. Before beginning the binary searches, the boundary cell is read for comparison, then the rest of the Gap cells are read. If there are no matches, then the binary search can begin at the appropriate half of the memory bank, i.e., at 32 or 96.

Next, at step S11-4, binary searches begin in each of the parallel memory banks. Binary searches begin in the center of the memory bank and proceed based on comparison determinations at that location by hopping up or down the memory bank by a number of rows on the order of 2 to the number of rows within the bank minus the number of steps as described above. In the example above, each search would begin at row 64 ($2^6$) and then will hop up or down 32 ($2^5$), then 16 ($2^4$), and so on until a match is made. Each search may also read the cached gap cells in the gap as already described above. This can be done prior to beginning the search.

Next, at step S11-5, if no match is made after a predetermined step, then the searches are switched between memory banks at the row last searched at that step. For example, as described above, after a given number of steps, if no match has been made, then the value must be in another memory bank at that row. For example, given 128 rows, after five steps the searches are switched to new memory banks. As described above, the searches are switched between memory banks in such a way as to avoid collisions. Therefore, each search is switched to a separate memory bank, and no memory bank has more than one search being performed in it at a time.

Next, at step S11-6, searches are continued to switch between memory banks until a match is made. Once all matches have been made and all searches are terminated, a new search cycle is begun and the process may be reported. The process ends at S5-7.

Accordingly, by the process above, a network device, such as a switch, may continuously initiate a new number of searches up to the number of parallel memory banks, in order to handle search requests quicker and more efficiently. Therefore, a network device such as a switch, may be able to support quicker processing speeds without faster or more expensive memory.

Although the invention has been described based upon these preferred embodiments, it would be apparent to those of skilled in the art that certain modifications, variations, and alternative constructions would be apparent, while remaining within the spirit and scope of the invention. For example, any high performance device may benefit from the described method for searching parallel memory banks. Also, other switch configurations could be used to take advantage of the invention. For example, the queue management unit, memory management and search switching unit, may all be separate function blocks or may all be part of the same function block, or some combination thereof. In order to determine the metes and bounds of the invention, therefore, reference should be made to the appended claims.

What is claimed is:

1. A network device comprising:
  a memory to be searched, said memory comprising a plurality of memory banks;
  a queue management unit configured to receive a plurality of search requests and to prioritize said search requests;
  a memory management unit coupled to said queue management unit and said memory and configured to initiate a plurality of binary searches based on said plurality of search requests, said plurality of binary searches being initiated simultaneously in different banks of said plurality of memory banks; and
  a search switching unit coupled to said memory management unit and said memory and configured to switch each said binary search from one memory bank of said plurality of memory banks to another memory bank of said plurality of memory banks after a predetermined number of search steps are performed in each said binary search.

2. The network device of claim 1, wherein said search switching unit is configured to switch each said binary search such that only one binary search is executed in each memory bank of said plurality of memory banks at a time.

3. The network device of claim 1, wherein said memory comprises four memory banks.

4. The network device of claim 1, wherein said predetermined number of steps is set based on a number of rows in each memory bank.

5. The network device of claim 1, wherein said network device further comprises:

gap memory; and said memory management unit is configured to cache gap cells of said plurality of memory banks into gap memory and to read said cached gap cells to each said binary search.

6. The network device of claim 5, wherein said memory management unit is configured to read said cached gap cells into said each binary search before said each binary search performs a first search step.

7. The network device of claim 1, wherein said network device comprises:

a switch, and said memory comprises ARL tables and rules tables.

8. The network device of claim 7, wherein said memory to be searched comprises on-chip memory.

9. The network device of claim 1, wherein said memory management unit is configured to initiate searches at a beginning of a search cycle when no existing searches are being executed against said memory, and said plurality binary searches having a number of searches less than or equal to the number of banks in said plurality of banks.

10. The network device of claim 9, wherein said queue management unit is configured to buffer search requests in a queue and prioritizes said queue in an order to be initiated.

11. A network device comprising:

a memory means to be searched, said memory means comprising a plurality of memory banks means;

a queue management means for receiving a plurality of search requests and prioritizing said search requests;

a memory management means coupled to said queue management means and said memory means, for initiating a plurality of binary searches based on said plurality of search requests, said plurality of binary searches being initiated simultaneously in different banks of said plurality of memory banks; and a search switching means coupled to said memory management means and said memory means and for switching each said binary search from one memory bank of said plurality of memory banks to another memory bank of said plurality of memory banks after a predetermined number of search steps are performed in each said binary search.

12. The network device of claim 11, wherein said search switching means being for switching each said binary search such that only one binary search is executed in each memory bank of said plurality of memory banks at a time.

13. The network device of claim 11, wherein said memory means comprises four memory banks.

14. The network device of claim 11, wherein said predetermined number of steps is set based on a number of rows in each memory bank.

15. The network device of claim 11, wherein said network device further comprises:

gap memory; and said memory management means being for caching gap cells of said plurality of memory banks into gap memory and to read said cached gap cells to each said binary search.

16. The network device of claim 15, wherein said memory management means is configured to read said cached gap cells into said each binary search before said each binary search performs a first search step.

17. The network device of claim 11, wherein said network device comprises:

a switching means, and said memory means comprises ARL tables and rules tables.

18. The network device of claim 17, wherein said memory means comprises on-chip memory.

19. The network device of claim 11, wherein said memory management means being configured to initiate searches at a beginning of a search cycle when no existing searches are being executed against said memory, and said plurality binary searches having a number of searches less than or equal to the number of banks in said plurality of banks.

20. The network device of claim 19, wherein said queue management means is configured to buffer search requests in a queue and prioritizes said queue in an order to be initiated.

21. A method for searching a network device, said method comprising the steps of:

providing a network device comprising a memory to be searched, said memory having a plurality of memory banks;

receiving a plurality of binary search requests at said network device;

initiating a plurality of binary searches in said plurality of memory banks at a same time, said plurality of binary searches being based on said plurality of binary search requests;

at a predetermined step in each search of said plurality of binary searches, switching said each search to a different memory bank of said plurality of memory banks; and continuing switching said each binary search to a different memory bank of said plurality of memory.

22. The method of step 21 further comprising the step of:

performing a networking function based on each said match.

23. The method of step 22, wherein said performing a networking function step comprises switching a network packet based on each said match.

24. The method of step 21, wherein said plurality of binary searches are initiated at a same time at a beginning of a search cycle of said network device in said initiating step.

25. The method of step 24, wherein said each binary search of said plurality of binary searches are switched such that only one binary search is executed against each memory bank of said plurality of memory banks at a time, during said switching step and said continuing switching step.

26. The method of claim 21 wherein said providing step includes providing said network device further comprising gap memory, and said method further comprising the step of:

first caching gap cells of each said memory bank of said plurality of memory banks into said gap memory;

second, reading said gap cells into each said search.

27. The method of claim 26 wherein said providing step includes providing said network device comprising memory gap memory, said memory comprising ARL tables and rules tables.

28. The network device of claim 27, wherein said providing step includes providing said network device comprising memory, said memory comprising on-chip memory.

29. The network device of claim 26, wherein said reading said gap cells step comprises read said gap cells into each said binary search before said each binary search performs a first search step.

30. The network device of claim 21, wherein said initiation step comprises initiating said plurality of binary searches at a beginning of a search cycle when no existing searches are being executed against said memory, said plurality of binary searches comprising a number of searches less than or equal in number to a number of banks in said plurality of banks.

31. The network device of claim 21, wherein said initiation step comprises a step of buffering said search requests into a queue and prioritizes said queue in an order to be initiated.

* * * * *